US008190883B2

(12) United States Patent
Francis et al.

(10) Patent No.: US 8,190,883 B2
(45) Date of Patent: May 29, 2012

(54) NETWORK IDENTITY MANAGEMENT SYSTEM AND METHOD

(75) Inventors: Paul Francis, Ithaca, NY (US); Liore Alroy, Passaic, NJ (US)

(73) Assignee: Picup, LLC, Newark, NJ (US)

( * ) Notice: Subject to any disclaimer, the term of this patent is extended or adjusted under 35 U.S.C. 154(b) by 887 days.

(21) Appl. No.: 12/071,598

(22) Filed: Feb. 22, 2008

(65) Prior Publication Data

US 2008/0209528 A1 Aug. 28, 2008

Related U.S. Application Data

(60) Provisional application No. 60/903,306, filed on Feb. 26, 2007, provisional application No. 60/903,303, filed on Feb. 26, 2007, provisional application No. 61/006,544, filed on Jan. 18, 2008.

(51) Int. Cl.
*H04L 29/06* (2006.01)
(52) U.S. Cl. .............................. 713/155; 726/4; 709/230
(58) Field of Classification Search .................. 713/155; 726/1–10; 707/3, 200; 709/203, 205, 230
See application file for complete search history.

(56) References Cited

U.S. PATENT DOCUMENTS

| | | | |
|---|---|---|---|
| 6,976,092 B1 * | 12/2005 | Daniell et al. ................. 709/246 |
| 7,016,875 B1 | 3/2006 | Steele et al. |
| 7,185,059 B2 * | 2/2007 | Daniell et al. ................. 709/206 |
| 7,263,102 B2 * | 8/2007 | Kreiner et al. ................. 370/401 |
| 7,379,464 B2 * | 5/2008 | Kreiner et al. ................. 370/401 |
| 7,673,327 B1 * | 3/2010 | Polis et al. ........................ 726/5 |
| 2002/0049751 A1 | 4/2002 | Chen et al. |
| 2003/0018726 A1 * | 1/2003 | Low et al. ....................... 709/206 |
| 2004/0199597 A1 * | 10/2004 | Libbey et al. ................. 709/207 |
| 2005/0027698 A1 | 2/2005 | Collet et al. |
| 2005/0038876 A1 | 2/2005 | Chaudhuri |
| 2005/0044423 A1 | 2/2005 | Mellmer et al. |
| 2005/0198124 A1 | 9/2005 | McCarthy |
| 2006/0168315 A1 * | 7/2006 | Daniell et al. ................. 709/237 |
| 2006/0174350 A1 | 8/2006 | Roever et al. |
| 2006/0265508 A1 | 11/2006 | Angel et al. |
| 2007/0003066 A1 * | 1/2007 | Schwartz et al. ............. 380/286 |
| 2008/0104170 A1 * | 5/2008 | Ananthanarayanan ....... 709/204 |
| 2009/0006202 A1 | 1/2009 | Alroy |

OTHER PUBLICATIONS

International Search Report and Written Opinion mailed Jun. 30, 2008 in corresponding PCT application No. PCT/US2008/02405.
International Search Report and Written Opinion mailed Jun. 25, 2008 in corresponding PCT Application No. PCT/US08/02406.
U.S. Appl. No. 12/071,599—Oct. 7, 2010 PTO Office Action.
U.S. Appl. No. 12/071,599—Apr. 11, 2011 PTO Office Action.
U.S. Appl. No. 12/071,600—Nov. 26, 2010 PTO Office Action.

* cited by examiner

*Primary Examiner* — Kim Vu
*Assistant Examiner* — John B King
(74) *Attorney, Agent, or Firm* — Davidson Berquist Jackson & Gowdey LLP

(57) ABSTRACT

Users of Internet services (e.g., SKYPE messaging service, GOOGLETALK messaging service, AOL INSTANT MESSENGER messaging service, and MICROSOFT MESSENGER messaging service) that are initially identified using separate identifiers that may be associated with respective service providers (e.g., email addresses) can manage network identities using a single unified set of account information managed by a registry service. The registry authenticates the user's request(s) to bind a service provider identity to his or her personal registry user record by presenting a random challenge to the user which the registry must then receive back from the service provider corresponding to the identity being added. Later, the registry may authenticate itself to service providers using information received from a service provider application as the service provider application authenticates itself to the service provider.

13 Claims, 8 Drawing Sheets

NETWORK IDENTITY MANAGEMENT SYSTEM AND METHOD

CROSS-REFERENCE TO RELATED APPLICATIONS

The present application claims priority to U.S. Patent Application No. 60/903,306 entitled "Network Identity Management System and Method," filed on Feb. 26, 2007, U.S. Patent Application No. 60/903,303 entitled "System and Method for Providing Identity-Based Services," filed on Feb. 26, 2007, and U.S. Application No. 61/006,544 entitled "Network Identity Management System and Method," filed on Jan. 18, 2008. The entire contents of those applications are incorporated herein by reference.

FIELD OF INVENTION

The present invention is directed to a method and system for managing network identities using an identity registry.

DISCUSSION OF THE BACKGROUND

A number of on-line communication protocols exist that enable users to create network identities and communicate with each other. For example, on the Internet, MICROSOFT MESSENGER messaging service, AOL INSTANT MESSENGER messaging service, SKYPE messaging service, and GOOGLETALK messaging service each provide some level of communication between their users as well as some presence information. However, communication between these competing systems has often been problematic. For example, these applications each maintain their own namespaces, even though they may support identical modes of communication (voice, say, or text IM), and they generally do not interoperate.

Some attempts have been made to utilize services or protocols that interconnect the separate services such that communication can be made between services. TRILLIAN messaging service and JABBER messaging service are attempts that have been made to allow inter-service communication with limited success. Moreover, the management of user identities is still not yet truly unified.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
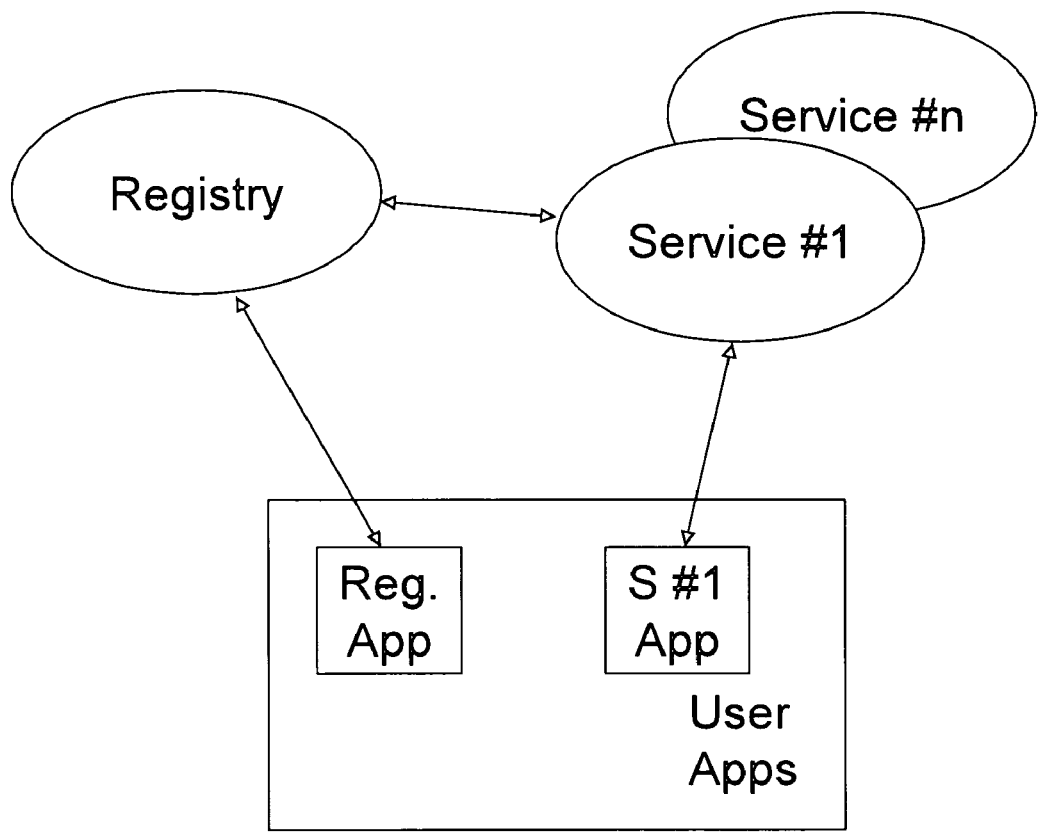
FIG. 1 is a block diagram of a network including a registry for user identities.

Turning to FIG. 1, a user of plural Internet services (e.g., SKYPE messaging service, GOOGLETALK messaging service, AOL INSTANT MESSENGER messaging service, and MICROSOFT MESSENGER messaging service) is initially identified using separate user names or other identifiers for each of the plural Internet services. For example, a fictitious user (e.g., John Jones) may have user names such as fictitioususer1@gmail.com and fictitiousdad@aol.com. Both of these user names provide methods of enabling other users to reach John Jones. However, there is no linkage between the two user names that allows John Jones to manage his account information uniformly and in one place. In addition, John Jones may not want all other users to know all of his user names or the presence information provided by the applications with which those user names are associated. To aid in account management, John Jones may subscribe to a registry service that will enable Mr. Jones to unify his on-line identities and centralize his account management and account log-on functions. One example of a registry may be the Personal Internet Communications Unification Project from NET2PHONE, Inc., referred to hereinafter as "PICUP" or "picup.com".

Figure 2:
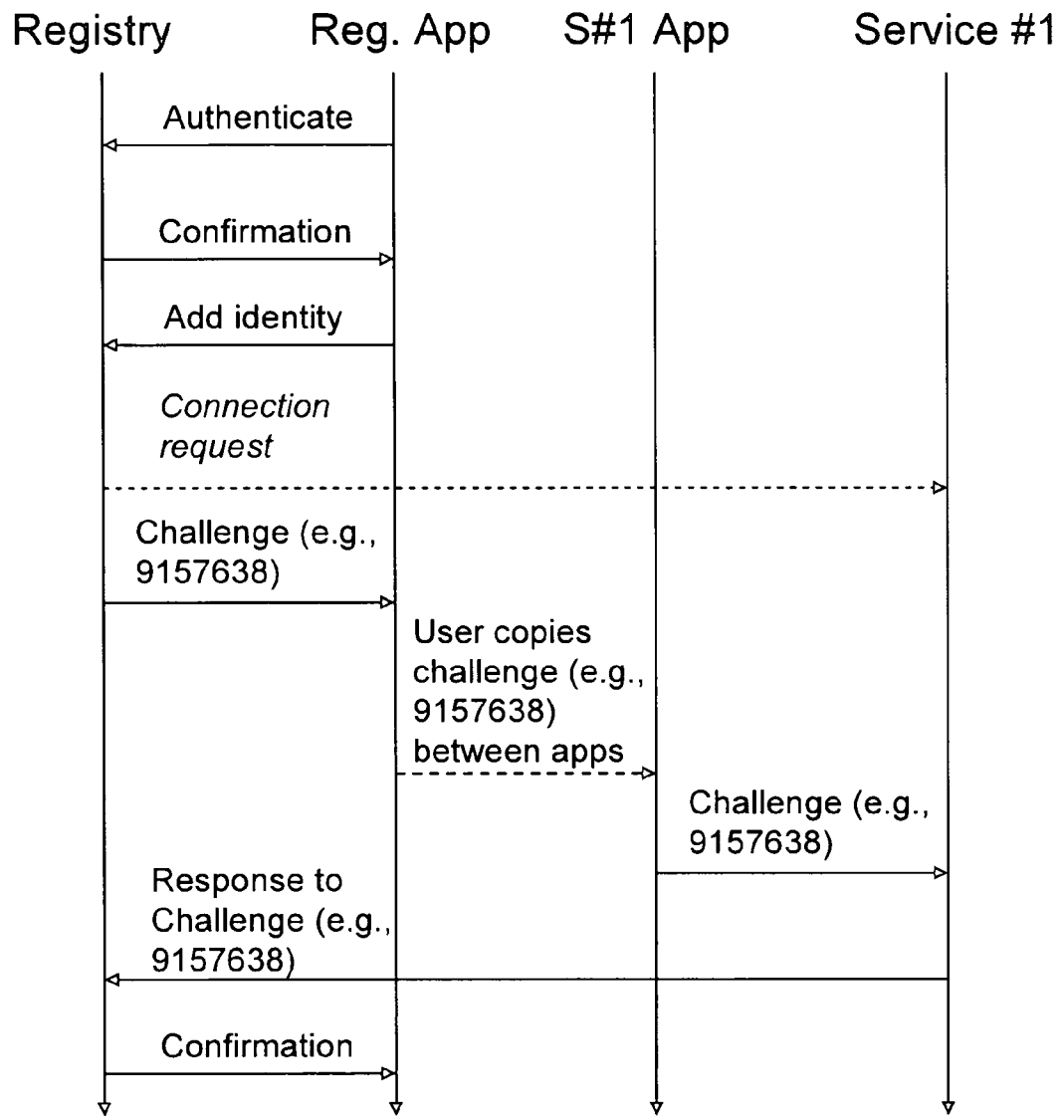
FIG. 2 is a message flow diagram showing a first identity authorizing process for use with the network of FIG. 1.

When Mr. Jones subscribes to the registry service, he is assigned or is allowed to select a registry-specific identifier, such as johnjones@picup.com. As shown in FIG. 2, Mr. Jones may authenticate himself with that name to the registry service (through any number of known authentication techniques and protocols). For example, as shown in FIG. 1, Mr. Jones may use an application (labeled "Reg. App" for registry application) to communicate with the registry service. Applications that can be used for this authentication include, but are not limited to, a web browser (e.g., MICROSOFT INTERNET EXPLORER web browser or MOZILLA FIREFOX web browser) using a user name and password combination or a custom application that passes authentication information (e.g., a user name and password combination, a fingerprint, a secure token or a signed message).

Having acquired a registry identifier from the registry and having authenticated himself to the registry, Mr. Jones can, as part of the identity management process, begin associating other identities with the registry identifier. To do this, Mr. Jones sends to the registry an "Add identity" message including an identifier such as a user name corresponding to one of the plural service providers. For example, Mr. Jones sends fictitioususer1@gmail.com to the registry.

The registry may parse the received identifier into a domain name and a user id and, if necessary (as indicated by the dashed line in FIG. 2), request a connection with the service provider associated with the domain name. For example, the registry may contact the GOOGLETALK messaging service server associated with the gmail.com domain name.

The registry then sends a "challenge" to Mr. Jones via his registry application. The challenge may be in the form of a random number, text or even graphic containing clear or obscured random text/numbers. For example, the challenge could be a random number "9157638." As depicted by the dashed line of FIG. 2, the user then transfers (e.g., copies and pastes or retypes) the random number from the registry application to a service provider application corresponding to the service provider (e.g., the GOOGLETALK messaging service server) for the identity (e.g., fictitioususer1@gmail.com) being added. The service provider application then contacts, on behalf of Mr. Jones, the service provider corresponding to the identifier (e.g., fictitioususer1@gmail.com) that he sent the registry. (Like with the registry application, the service provider application may also be implemented as either a customized application or a web browser-based application.) The service provider application then sends to the service provider the same information that was contained in the challenge that he received from the registry. Lastly, the service provider sends to the registry the challenge that the service provider received from the service provider application (as it was transferred by the user). This completes a confirmation cycle that enables the registry to verify that the user does control the account corresponding to the identifier of the service provider.

Figure 3:
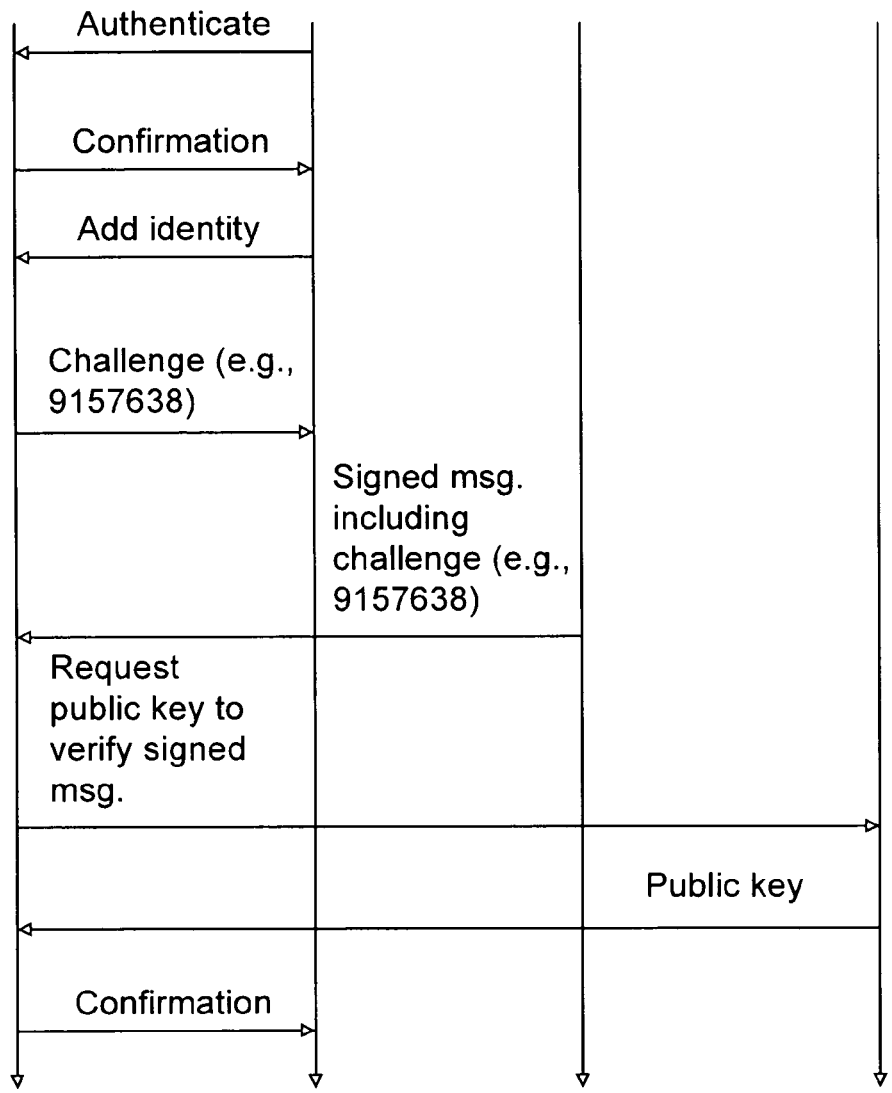
FIG. 3 is a message flow diagram showing a second identity authorizing process for use with the network of FIG. 1.

As shown in FIG. 3, a second identity adding process can be used instead. In this process, the registry is not required to make a connection with the service provider to receive the challenge. Instead, after the challenge is received by the registry application, the challenge is provided to the service provider application that signs the challenge using a private key of a public/private key pair. The service provider application then sends the signed message back to the registry, and the registry can verify the signed message using the public key received from a key repository corresponding to the service provider.

Figure 4:
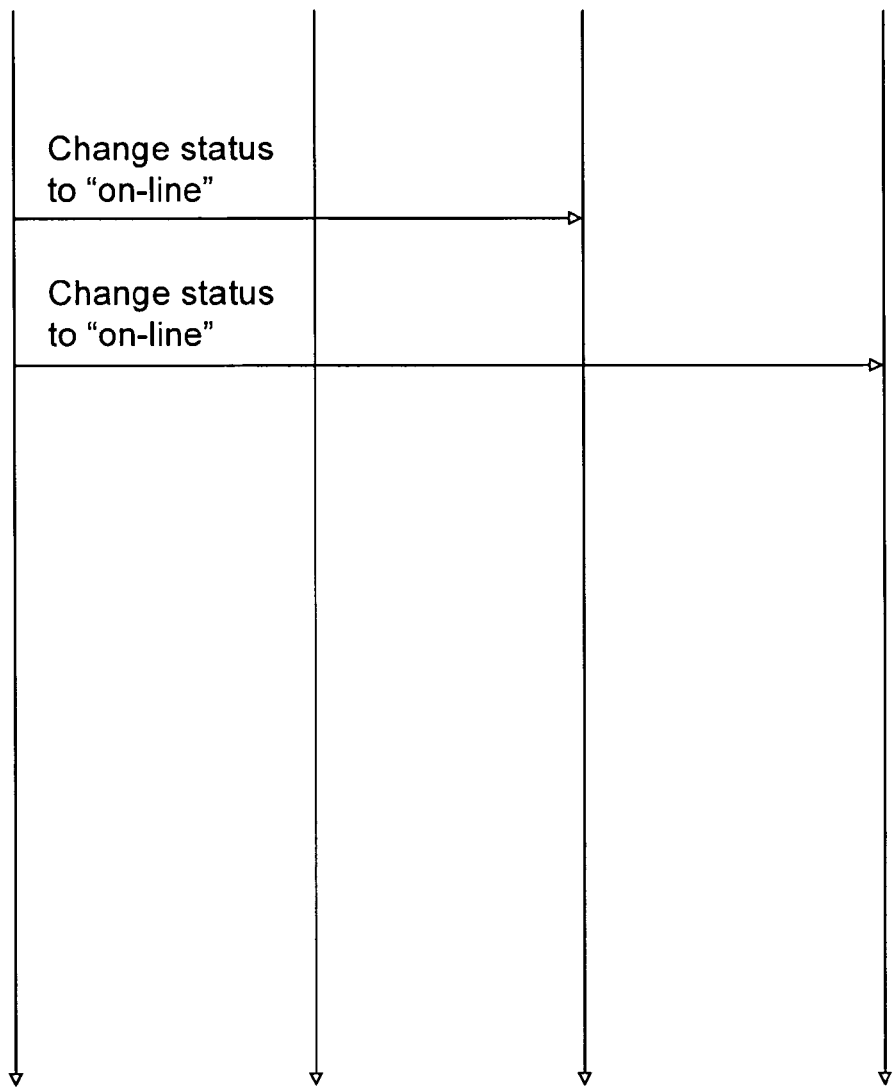
FIG. 4 is a message flow diagram showing the propagation of presence information from a registry to plural service providers.

The registry may consolidate not only identities but also real-time information (e.g., presence information) about the identities. For example, as shown in FIG. 4, Mr. Jones may set his status information to "on-line" (using either a registry application or using a service provider application). When this change is received by the registry, the registry propagates this information to all of the service providers that are managed by the registry. However, this information management assumes that the registry and the services can authenticate each other so that the service providers and the registry know that the information is to be shared.

Figure 5:
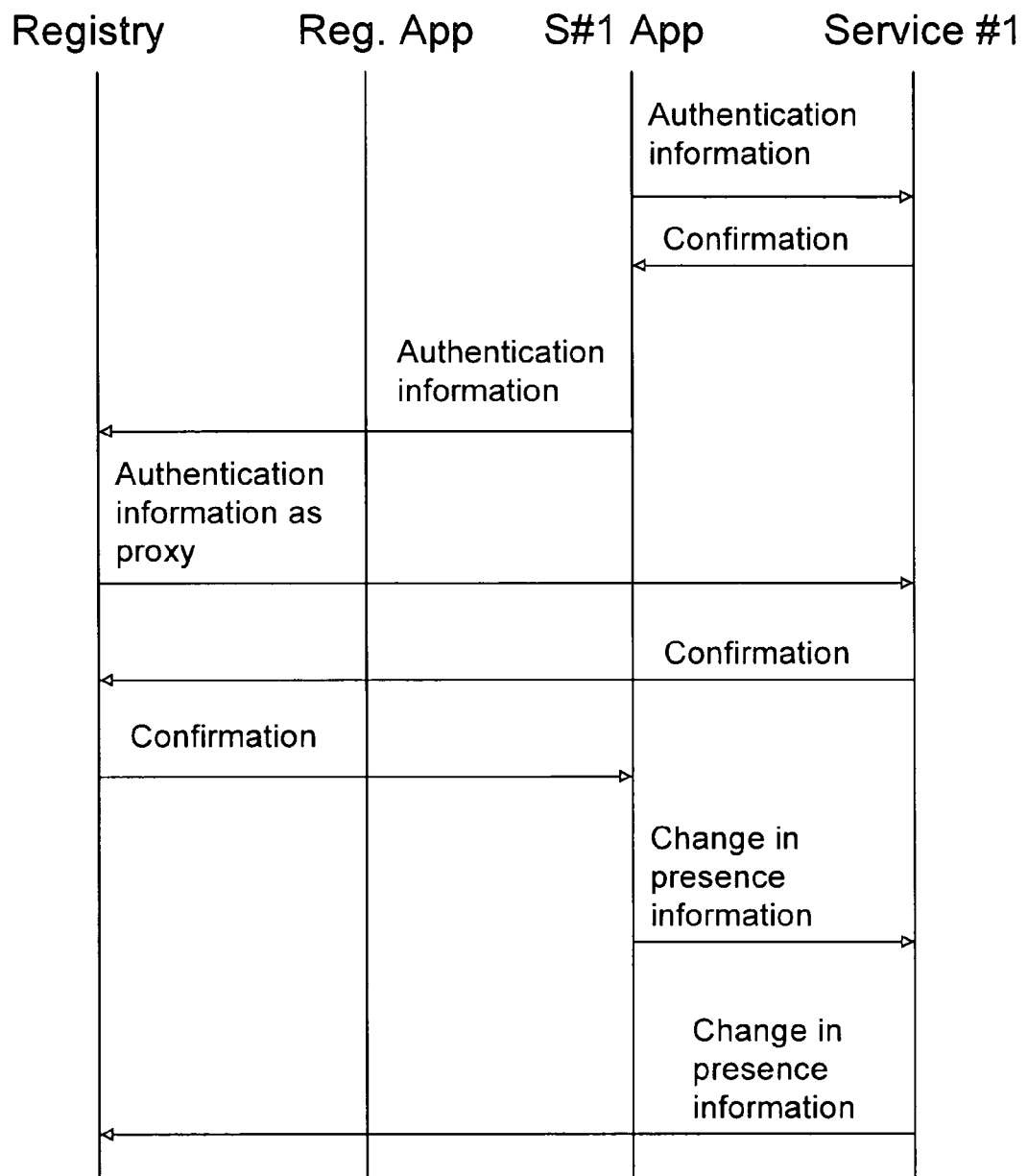
FIG. 5 is a message flow diagram showing a first process for authentication and presence information updating.

One way in which this can be achieved is to have a service provider application running locally that authenticates the user to both the service provider and to the registry. As shown in FIG. 5, a service provider application has authenticated itself to its corresponding service provider (e.g., AOL Instant Messaging service). When the user elects to use the registry to centralize its presence information, the service provider application sends to the registry the log-in information (e.g., username and password) used in the initial authentication to the service provider. The registry can then authenticate itself to the service provider as well using the authentication information that the service provider is expecting. To avoid the service provider assuming that this is a new login by the user at a different location (that may cause the existing log-in to be terminated), the registry identifies to the service provider that the registry is logging on only as a proxy that will receive presence information and not as a communications end-point.

Later, when Mr. Jones uses his service provider application to change his presence information (e.g., by setting it to "Do Not Disturb"), the information received by the service provider will be passed to the registry so that other information services may see the same change, as shown in the last two steps of FIG. 5.

Figure 6:
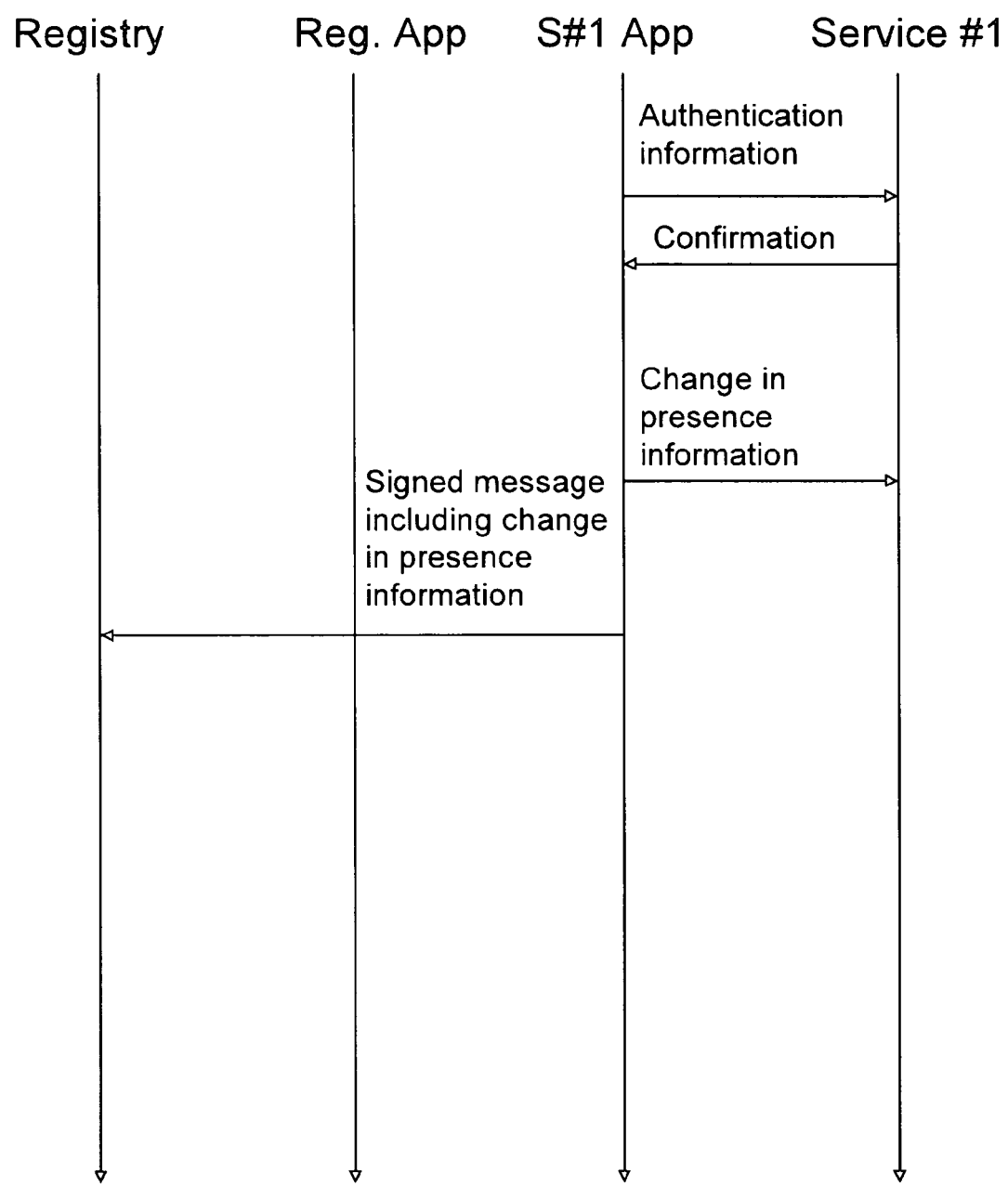
FIG. 6 is a message flow diagram showing a second process for authentication and presence information updating.

Alternatively, in the case of having used the authentication method of FIG. 3, as shown in FIG. 6, the service provider application can be configured to send the change in presence information to both its corresponding service provider and the registry. When the change in presence information is sent to the registry, it is preferably signed using the same private key that was used during the process of adding an identity shown in FIG. 3. In such a configuration, the registry can verify the authenticity of signed message containing the change in presence information using the public key corresponding to the identity. This enables the registry to receive presence information updates without requiring the registry to log into the service provider as a proxy. Moreover, if the registry has cached a copy of the public key received during the identity adding process, the registry does not have to re-contact the service provider to verify the authenticity of the change. This can reduce load on the service provider's network.

Figure 7:
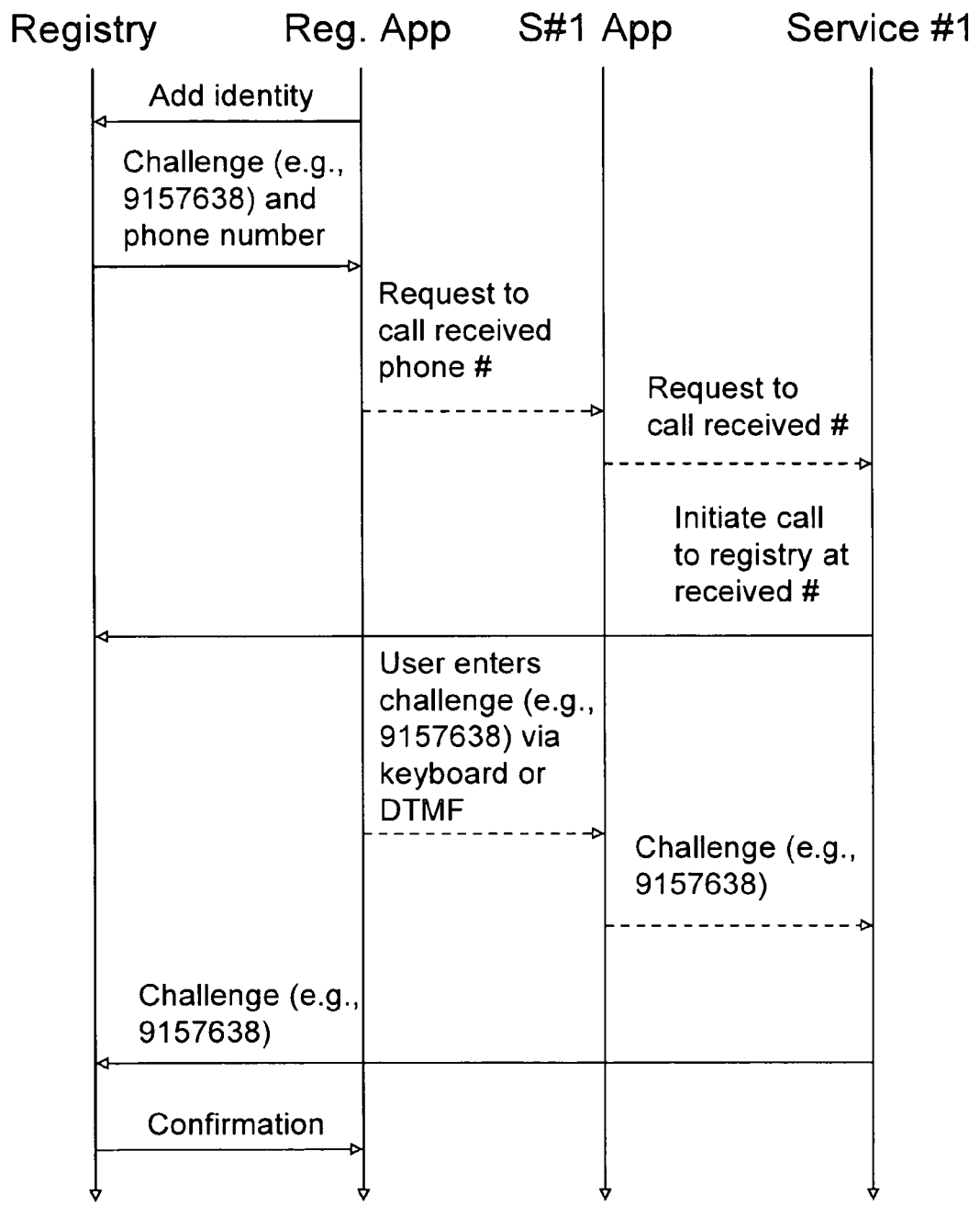
FIG. 7 is a message flow diagram showing a first identity authorizing process for use with the network of FIG. 1.
Figure 8:
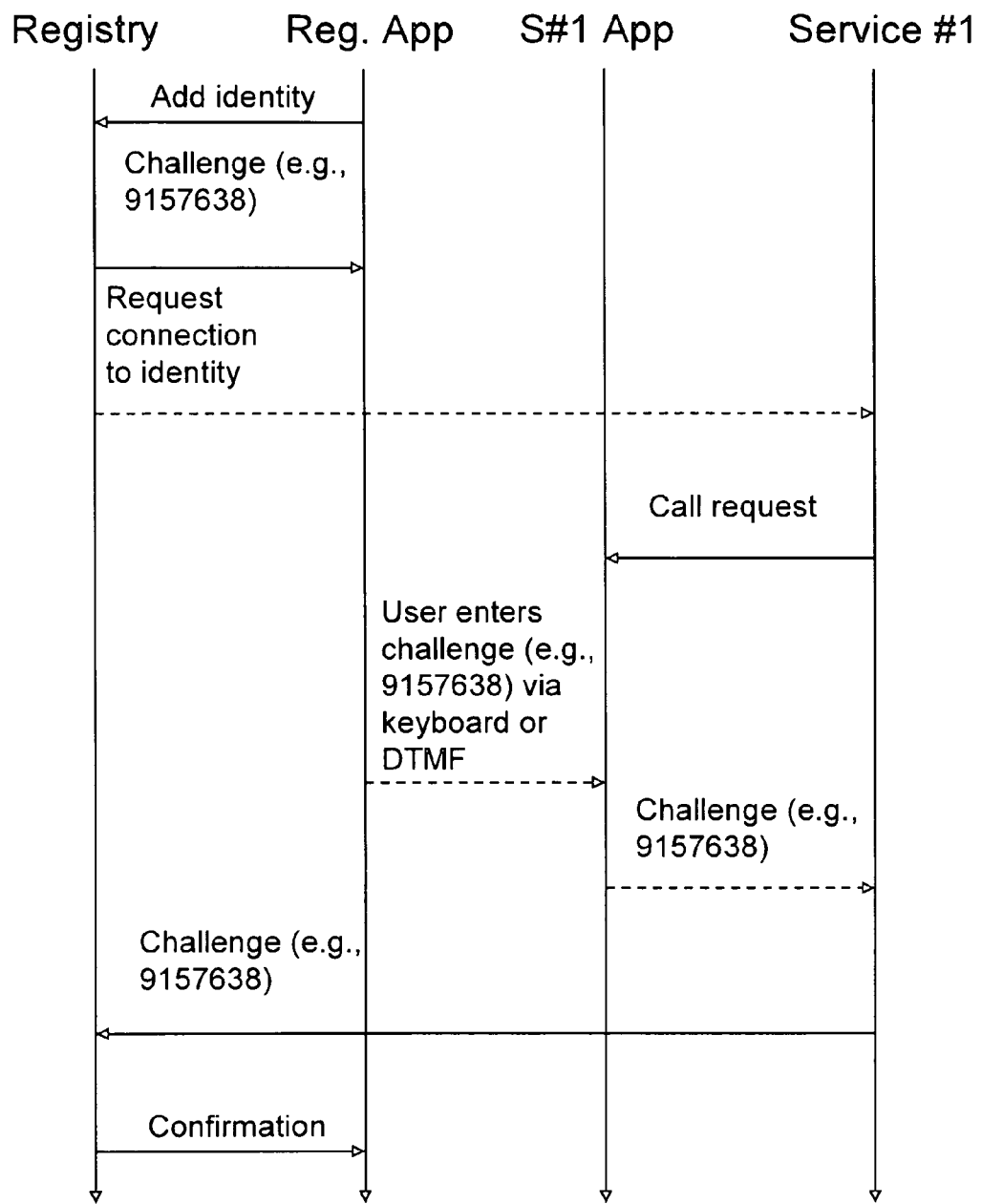
FIG. 8 is a message flow diagram showing a first identity authorizing process for use with the network of FIG. 1.

As shown in FIGS. 7 and 8, various other authentication protocols are also possible. In FIG. 7, assuming that the registry application has already sent an "Add identity" message including an identifier to the registry, the registry sends back a random challenge to the registry as was discussed above with reference to FIG. 2. However, as shown in FIG. 7, contemporaneously with receiving the challenge, the registry application also receives a phone number (or the name of an identity) indicating where it should be contacted. The user provides this phone number (or identity) to the service provider application which forwards it to the service provider for initiation of a telephone call. The service provider then connects to the telephone number (or identity). In at least one such embodiment, the telephone number (or identity) being used by the registry is provided by the service provider such that the authentication phone call remains "on network" for the service provider. Upon establishing a phone connection between the service provider and the registry, the user is prompted to enter the challenge (e.g., using a keyboard or DTMF tones, depending on the capabilities of the service provider application). Because the registry is able to determine on whose behalf the incoming call is being made (e.g., by looking at the caller ID information for a SKYPE telephone to SKYPE telephone call), the registry can then confirm that the challenge has been properly delivered to the user corresponding to the identity which is being added.

Alternatively, as shown in FIG. 8, similar to the authentication process shown in FIG. 7, a telephone connection can be made between the service provider and the registry so that the user may send the challenge to the registry over a telephone connection. However, in FIG. 8, it is the registry that establishes a connection to the service provider associated with the identity being added and requests that a connection be made to that identity. In this way the requirement for authentication of the identity on the service provider is pushed to the original service provider itself.

While the above embodiments of FIGS. 7 and 8 have been described with respect to establishing a telephone connection (e.g., a SKYPE telephone) between the registry and the service provider, other types of connections are also possible. For example, a text messaging connection between authenticated text messaging clients (e.g., between MICROSOFT MESSENGER messaging service clients) can also be established and the challenge(s) sent across those connections.

In configurations such as those discussed above with respect to FIGS. 7 and 8, the registry may include an automated response program (e.g., an avatar) that handles the incoming and/or outgoing connections and the parsing of the received challenges and/or the prompting for the challenges, whether the connections be telephone-based, text-based or a combination thereof.

A system, such as the registry described above, that tracks identities and corresponding presence information can provide additional that also make use of information stored in the registry. For example, the registry can support in-bound (i.e., pull to the user) and out-bound (i.e., push to the user) directed advertising to a particular user, whether or not the user manages plural identities through the registry. The advertising sent may be informed by the user's behavior on one or across multiple service provider domains.

Using a system such as the registry system described above, a user may also be able to manage a set of preferences that controls the order in which the user will be contacted when an in-bound request for communications arrives at the registry. For example, when Bob wants to initiate a text/voice messaging session with Sally, Bob's registry-compatible text messaging client may see that Sally is on-line and available for text messaging, but it may not show whether Sally is using AOL IM messaging service, GOOGLE TALK messaging service, or NET2PHONE COMMCENTER messaging service (because Sally doesn't want it known or because Bob's contact management software only displays presence information about modes, not applications). Bob might therefore invite Sally to a text and/or voice messaging chat session without knowing to which application the "invite" message is sent. That decision could be made by the registry in accordance with logic rules Sally establishes. For example, Sally might have established a connection preference rule (e.g., a "find me" rule) for the PICUP persona Bob is calling that "rings" her first using the NET2PHONE COMMCENTER messaging service, then using the GOOGLE TALK messaging service, then using the AOL INSTANT MESSENGER messaging service. Alternatively, the preference may be based on dynamic conditions, such as which application was most recently used, what time of day it is, what day it is, whether it is a holiday, etc. Other logic rules are possible, and all could be maintained as part of the registry user record for Sally.

Such preferences also make it possible to receive a preferred mode of communication. For example, the list of preferences may state that during the weekday, the preferred method of connecting is via a specified work telephone number, and then at a cell phone, and then at a voice-based messaging service, then at a text-based messaging service, etc. Alternatively, the list of preferences may state that during the weekend, the preferred method of connecting is via a voice-based messaging service, then at a text-based messaging service, and then no other connections are permitted. Thus, an initiating user may use the registry application to ask the registry what the best match is for contacting a receiving user, and then, based on the information returned, the registry application can start (or request that the user start) the appropriate service provider application to establish the communication channel between the initiating and receiving users.

The registry application may also be configured such that it interfaces with at least one of the service provider applications to provide connection control (e.g., call set up and tear down) and messaging services. In such a configuration, the user interfaces with the registry application to send messages (e.g., text message, voice messages or voice-over-IP call streams) to the service provider application which then sends them on to its corresponding service provider. The registry application may perform media protocol translations as necessary to provide the messages to the service provider application in a format which it understands. For example, if the registry application receives a voice stream in a first format (e.g., raw) but the service provider application expects it in a second format (e.g., compressed), then the registry application may perform the necessary conversion. In one embodiment, the registry application and the service provider application engage in a format negotiation to determine a preferred format for sending the messages.

While certain configurations of structures have been illustrated for the purposes of presenting the basic structures of the present invention, one of ordinary skill in the art will appreciate that other variations are possible which would still fall within the scope of the appended claims.

The invention claimed is:

1. A method of managing network identities, comprising:
receiving a request at an identity registry to add a first network identity to a user record, wherein the first network identity includes at least an identifier used to identify the first network identity to a server computer of a remote first service provider separate from the identity registry;
sending, from the identity registry and to a requester of the request, a random challenge generated by the identity registry, wherein the random challenge comprises a graphic image of at least one of a random number and a random text string;
receiving the random challenge at the identity registry from the first service provider after the requestor has forwarded the challenge to the first service provider; and
adding the first network identity to the user record when the random challenge received at the identity registry from the first service provider matches the challenge forwarded to the first service provider, wherein the random challenge is received from the first service provider as a corresponding one of a random number and a random text string not in the form of a graphic image.

2. The method as claimed in claim 1, wherein the random challenge comprises a random number.

3. The method as claimed in claim 1, wherein the random challenge comprises a random text string.

4. The method as claimed in claim 1, wherein the first service provider comprises a provider of instant messaging services.

5. The method as claimed in claim 1, wherein the first service provider comprises a provider of voice-over-IP services.

6. The method as claimed in claim 1, wherein the first service provider comprises a Local Exchange Carrier.

7. The method as claimed in claim 1, wherein receiving the random challenge from the first service provider comprises:
establishing via the first service provider a connection between a service provider application and the identity registry; and
receiving the random challenge via the established connection.

8. The method as claimed in claim 7, wherein the service provider application requests the first service provider to establish the connection.

9. The method as claimed in claim 7, wherein the registry requests the first service provider to establish the connection.

10. The method as claimed in claim 7, wherein the connection comprises a telephone connection.

11. The method as claimed in claim 7, wherein the connection comprises a text messaging connection.

12. The method as claimed in claim 1, wherein an advertising service that is operatively coupled to the identity registry sends at least one advertisement to one of the network identities in such user record.

13. The method as claimed in claim 1, further comprising:
receiving a request at the identity registry to add a second network identity to the user record, wherein the second network identity includes at least an identifier used to identify the second network identity to a second service provider;
sending, from the identity registry and to a requester of the request, a random challenge generated by the identity registry;
receiving the random challenge from the second service provider after the requester has forwarded the challenge to the second service provider; and
adding the second network identity to the user record when the random challenge from the second service provider matches the challenge forwarded to the second service provider

* * * * *